United States Patent
Cheung et al.

(10) Patent No.: US 12,254,564 B2
(45) Date of Patent: Mar. 18, 2025

(54) ARTIFICIAL INTELLIGENCE-ASSISTED VIRTUAL OBJECT BUILDER

(71) Applicant: Meta Platforms, Inc., Menlo Park, CA (US)

(72) Inventors: Vincent Charles Cheung, San Carlos, CA (US); Jiemin Zhang, Sunnyvale, CA (US); Bradley Duane Kowalk, San Francisco, CA (US); Meng Wang, Hoboken, NJ (US)

(73) Assignee: Meta Platforms, Inc., Menlo Park, CA (US)

( * ) Notice: Subject to any disclaimer, the term of this patent is extended or adjusted under 35 U.S.C. 154(b) by 143 days.

(21) Appl. No.: 18/067,980

(22) Filed: Dec. 19, 2022

(65) Prior Publication Data
US 2023/0260208 A1    Aug. 17, 2023

Related U.S. Application Data

(60) Provisional application No. 63/309,760, filed on Feb. 14, 2022.

(51) Int. Cl.
G06T 17/00    (2006.01)
G06F 3/01    (2006.01)
(Continued)

(52) U.S. Cl.
CPC .............. G06T 17/00 (2013.01); G06F 3/013 (2013.01); G06F 3/017 (2013.01); G06F 40/205 (2020.01); G06V 10/70 (2022.01)

(58) Field of Classification Search
CPC ....... G06T 17/00; G06F 40/205; G06F 3/013; G06F 3/017; G06V 10/70
See application file for complete search history.

(56) References Cited

U.S. PATENT DOCUMENTS 8,928,672 B2    1/2015  Corazza et al.
10,228,760 B1    3/2019  Ross et al.
(Continued)

FOREIGN PATENT DOCUMENTS

CN    104436648 A    3/2015
KR    102204027 B1    1/2021
(Continued)

OTHER PUBLICATIONS

International Search Report and Written Opinion for International Application No. PCT/US2022/049030, mailed Mar. 6, 2023, 11 pages.
(Continued)

*Primary Examiner* — Xin Sheng
(74) *Attorney, Agent, or Firm* — Potomac Law Group, PLLC; Dannon G. Allbee

(57) ABSTRACT

Aspects of the present disclosure are directed to an artificial intelligence ("AI") application running in conjunction with an artificial reality ("XR") space. The AI Builder responds to user commands, verbal or gestural, to build or edit spaces or objects in space. If the requested object is of a type recognized by the AI Builder, then the AI Builder builds the object from one or more stored templates. The new object's location is determined by the objects that already exist in the user's XR environment and on commands or gestures from the user. If the AI Builder does not recognize the requested object, the user can show an image to the AI Builder, and the AI builds a 3D object in the XR space according to that image. To ease collaboration among users, the AI Builder may present its user interface as a non-player character within the XR world.

20 Claims, 8 Drawing Sheets

(51) Int. Cl.
*G06F 40/205* (2020.01)
*G06V 10/70* (2022.01)

(56) References Cited

U.S. PATENT DOCUMENTS

| | | |
|---|---|---|
| 10,551,993 B1 | 2/2020 | Sanocki et al. |
| 10,586,369 B1 | 3/2020 | Roche et al. |
| 10,839,481 B1 | 11/2020 | Chen |
| 10,997,766 B1 | 5/2021 | Hong et al. |
| 11,113,859 B1 | 9/2021 | Tong et al. |
| 11,263,818 B2 * | 3/2022 | Shreve ............... G06T 19/006 |
| 11,521,189 B1 | 12/2022 | Gordon et al. |
| 2015/0231510 A1 | 8/2015 | Hain et al. |
| 2016/0027198 A1 | 1/2016 | Terry et al. |
| 2016/0189426 A1 * | 6/2016 | Thomas ............ G02B 27/0172 345/633 |
| 2016/0217590 A1 | 7/2016 | Mullins et al. |
| 2016/0232698 A1 | 8/2016 | Kim et al. |
| 2017/0052595 A1 | 2/2017 | Poulos et al. |
| 2017/0206695 A1 | 7/2017 | Kim et al. |
| 2017/0243403 A1 | 8/2017 | Daniels et al. |
| 2017/0359467 A1 | 12/2017 | Norris et al. |
| 2018/0088791 A1 | 3/2018 | Kim et al. |
| 2019/0188892 A1 | 6/2019 | Wong et al. |
| 2019/0204906 A1 | 7/2019 | Ross et al. |
| 2019/0355181 A1 | 11/2019 | Srinivasan et al. |
| 2020/0042083 A1 | 2/2020 | Min |
| 2020/0211512 A1 | 7/2020 | Sztuk et al. |
| 2020/0410770 A1 * | 12/2020 | Choi ................... G06V 10/764 |
| 2021/0192684 A1 | 6/2021 | Pardeshi et al. |
| 2021/0287430 A1 | 9/2021 | Li et al. |
| 2022/0139056 A1 | 5/2022 | Fieldman |
| 2022/0139254 A1 | 5/2022 | Ramani et al. |
| 2022/0180612 A1 | 6/2022 | McKeever |
| 2022/0233956 A1 | 7/2022 | Fukushige |
| 2022/0274021 A1 | 9/2022 | Wei |
| 2022/0277489 A1 | 9/2022 | Ali et al. |
| 2022/0291808 A1 | 9/2022 | Stevens et al. |
| 2023/0090253 A1 | 3/2023 | Meadows et al. |
| 2023/0115818 A1 | 4/2023 | Yoo et al. |
| 2024/0112418 A1 | 4/2024 | Barrick et al. |
| 2024/0112428 A1 | 4/2024 | Levi et al. |
| 2024/0212265 A1 | 6/2024 | Agarwal et al. |
| 2024/0316454 A1 | 9/2024 | Joynes et al. |

FOREIGN PATENT DOCUMENTS

| | | |
|---|---|---|
| KR | 102275906 B1 | 7/2021 |
| WO | 2017126085 A1 | 7/2017 |

OTHER PUBLICATIONS

Singh R. D., et al., "3D Convolutional Neural Network for Object Recognition: A Review," Multimedia Tools and Applications, vol. 78, No. 12, Dec. 11, 2018, pp. 15951-15995.
International Search Report and Written Opinion for International Application No. PCT/US2023/013013, mailed Apr. 24, 2023, 11 pages.
International Search Report and Written Opinion for International Application No. PCT/US2023/013020, mailed May 31, 2023, 11 pages.
Kim K., et al., "Painting Outside as Inside: Edge Guided Image Outpainting via Bidirectional Rearrangement with Progressive Step Learning," arxiv.org, Nov. 9, 2020, 9 pages.
International Search Report and Written Opinion for International Application No. PCT/US2023/032015, mailed Dec. 19, 2023, 9 pages.
OPENCV, "Finding Contours in your Image," [Retrieved on Sep. 20, 2022], 2 pages, Retrieved from the Internet: URL: https://docs.opencv.org/3.4/df/d0d/tutorial_find_contours.html.
Wikipedia, "Surface of Revolution," [Retrieved on Sep. 20, 2022], 5 pages, Retrieved from the Internet: URL: https://en.wikipedia.org/wiki/Surface_of_revolution.
European Search Report for European Patent Application No. 24160192.1, dated Sep. 2, 2024, 10 pages.
Goto M., et al., "A Beat Tracking System for Acoustic Signals of Music," Proceedings of the Second ACM International Conference on Multimedia, Oct. 15, 1994, pp. 365-372.
International Preliminary Report on Patentability for International Application No. PCT/US2023/013013, mailed Aug. 29, 2024, 9 pages.

* cited by examiner

ARTIFICIAL INTELLIGENCE-ASSISTED VIRTUAL OBJECT BUILDER

CROSS-REFERENCE TO RELATED APPLICATIONS

This application claims priority to U.S. Provisional Patent Application No. 63/309,760, titled " Artificial Intelligence-Assisted Virtual Object Builder," filed Feb. 14, 2022, which is herein incorporated by reference in its entirety.

BACKGROUND

Many people are turning to the promise of artificial reality ("XR"): XR worlds expand users' experiences beyond their real world, allow them to learn and play in new ways, and help them connect with other people. An XR world becomes familiar when its users customize it with particular objects that interact in particular ways among themselves and with the users. While creating a simple object in an XR world is quite easy for most users, as objects get more complex, the skills needed for creating them increase until only experts can create multi-faceted objects such as a house. To create an entire artificial world can take weeks or months of an expert's time. As artificial worlds become more photorealistic, and as the objects within them provide richer interactive experiences, the effort to successfully create them increases even more until some creation is beyond the scope, or the resources, of many, even experts.

In contrast, the success of an XR platform is dependent on the amount of people who can create their own customized spaces within the XR worlds and populate them with objects of their own creation. User engagement with the XR worlds decreases when the user is prevented from making a world to their liking or from populating it with rich, realistic objects.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
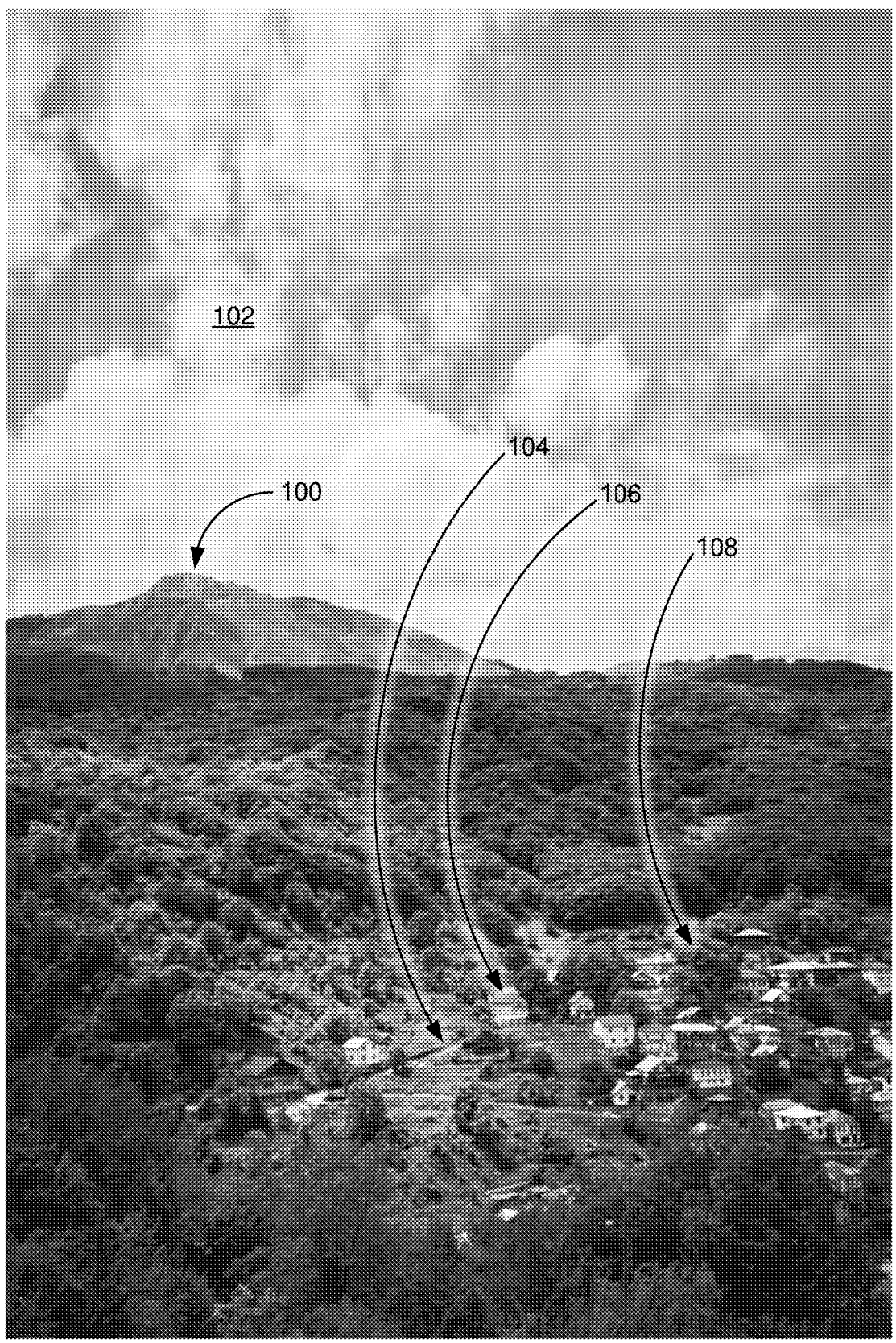
FIG. 1 is a conceptual diagram of an AI-created scene of a mountain village.

An AI Builder can respond to user commands to build or edit objects in an XR space. The commands can be verbal (interpreted by natural-language processing) and/or gestural (based on hand, gaze, and/or XR controller tracking). As discussed below, the AI builder can interpret building commands in terms of an object to build and a location. Note that "objects" is meant to be taken quite broadly. Objects in the XR world include, for example, "physical" objects, spaces, aspects of the surrounding environment (e.g., the sky with weather, landscape with plants), sounds, and NPCs. The AI builder can use an NPC as a collaboration point for multiple users to build together and to illustrate the building process.

The AI Builder receives a command, from a user, that can include words, gestures, and/or images. In some cases, a client running on a server hosting the XR space gets a stream of user audio, which is then streamed to a speech recognition server. The AI Builder invokes a natural-language processing engine to parse the command (e.g., by applying various machine learning models, key-phrase recognizers, etc.) to identify whether to build a new object or edit (which may include deleting) an existing object. The AI Builder identifies the particular object from the user's phrases, gestures, or images.

When the command is an edit command, the AI Builder can determine how to implement the edit the command by identifying key word/phrases or through the natural-language processing engine mapping the command to an intent (e.g., change size, move, rotate, change color, etc.), which the AI builder can implement.

When the command is a build command the AI Builder initially tries to match the requested object's description by searching the object description or through image matching in a library of object templates. If the type of object that the user wants built matches an item in the AI Builder's library, then the AI Builder selects the object to build. The user can then edit the object through further commands.

If the AI Builder does not have a template that matches the object description. The AI Builder can use a generative adversarial network ("GAN") to build a virtual object that matches the user's description in the build command (e.g., using one or both of a verbal description and/or one or more images).

In some implementations, the user can present a real-world object for the AI Builder to recreate in the XR space. To build a model of the real-world object, the AI Builder directs the user to take one or more photos of the real-world object, e.g., from various angles/viewpoints. If the images are not captured with depth information (e.g., by a depth camera that computes a depth values for each pixel) the AI Builder applies a machine learning model trained to generate depth data for an image or series of images. Once the depth data is determined, the AI Builder can combine the depth data for the images into a 3D model (e.g., by determining a common coordinate space and mapping the depth data to points for a 3D mesh). The AI Builder can then apply coloring from the images as a texture to complete the 3D model of the real-world object. This allows the user to easily "import" real objects familiar to her into her XR world.

In addition to selecting an object to build, either from the library, the GAN creation from the user's description, or the importing of a real-world object, the AI Builder can determine an indicated location at which to create the object. The new object's location can be determined based on one or more of the nature of the object, the objects that already exist in the user's XR environment, phrases or gestures from the user (such as "by the tall tree" or where the user is pointing when making the build command), and/or a history of the user in the XR space (e.g., where the user currently is or has been, areas the user typically builds in, etc.) To avoid forcing the user to make numerous common-sensical editing commands, the AI Builder understands the nature of the object it is building and acts in accordance with that nature. For example, a house's nature generally requires that it should be built on the ground and in a large enough open area, and the AI Builder puts the house there. If the user's command does not provide enough location specifics and there is no open area large enough, the AI Builder queries the user for further directions. The user can override the AI Builder's choices as he sees fit.

Once built, the user can have the AI Builder change the object. Because the AI Builder understands the built XR environment, users can refer to objects by their familiar names (e.g., "the bird in the tree"). For example, objects can have various tags, added by creators or automatically determined when the objects were built, which can be mapped into a semantic space and a user command can be mapped into the semantic space; where the command can be determined to match the existing object if the distance between them in the semantic space is below a threshold. An object can be moved or rotated. Its material composition or size can be changed. A complex structure can be altered: "Make the house bigger, a 3-story mansion," and the AI Builder fills in the details if it knows how to (based on its library of templates) or asks the user for clarification.

As mentioned above, the UI to the AI builder may be through spoken commands, gestures, and XR controllers. The AI Builder may also create a builder NPC in the artificial world that responds to build and edit commands. The AI Builder can give the NPC characters, actions, or missions to accomplish. The NPC eases collaboration among users who wish to build something together and provides a user experience which is more engaging than just a disembodied voice or objects that appear from nowhere. The use of an NPC can also eliminate the need for a "wake phrase" to distinguish when the user is providing a build/edit command versus making some other comment or talking with another user. For example, the AI Builder can determine if the user is providing a command based on whether the user is looking or pointing at the builder NPC, pointing to a location appropriate for building a new object, and/or by mapping the content of the command into a semantic space (e.g., applying a NLP model) to determine whether the words of the command match a type for known commands.

While a user may create a new artificial world in any order that is comfortable, the user may wish to begin building a world by asking the AI Builder to put up a background (the "Skybox") that shows the general location of the user's world. Additional details on Skyboxes, and on generating a Skybox from an image, are provided in U.S. Provisional Patent Application No. 63/309,767, which is hereby incorporated by reference in its entirety. The Skybox is the distant background, and it cannot be touched by the user, but it may have changing weather, seasons, night and day, and the like. In the example of FIG. 1, the AI Builder has responded to the user's request: "Put up a mountainous background" by putting up the distant mountain 100 and the sky 102.

The Skybox cannot be touched, but the user is free to ask the AI Builder to assist in building a visitable space for the user that makes sense in terms of the Skybox. Thus, the village in FIG. 1 results when the user requests "Build me a village." The AI Builder has created an entire village, 104 and not just any village. The AI Builder uses its knowledge of the user's selected Skybox to build an appropriate village 104. For example, certain skyboxes can have associated tags (e.g., for time period, geographic location or type, time of day, season, etc.) and the AI Builder can determine a match score between the skybox tags and candidate objects to build (the match score determined based on closeness in a semantic space for tags of the skybox and of candidate objects) as a ranking factor for selecting which candidate object to select. This particular space has houses 106 and an outdoors with trees 108. The user can walk around to explore the village 104. Although the houses 106 in the village 104 look good from the outside, the AI Builder may or may not have filled them with interiors.

Figure 2:
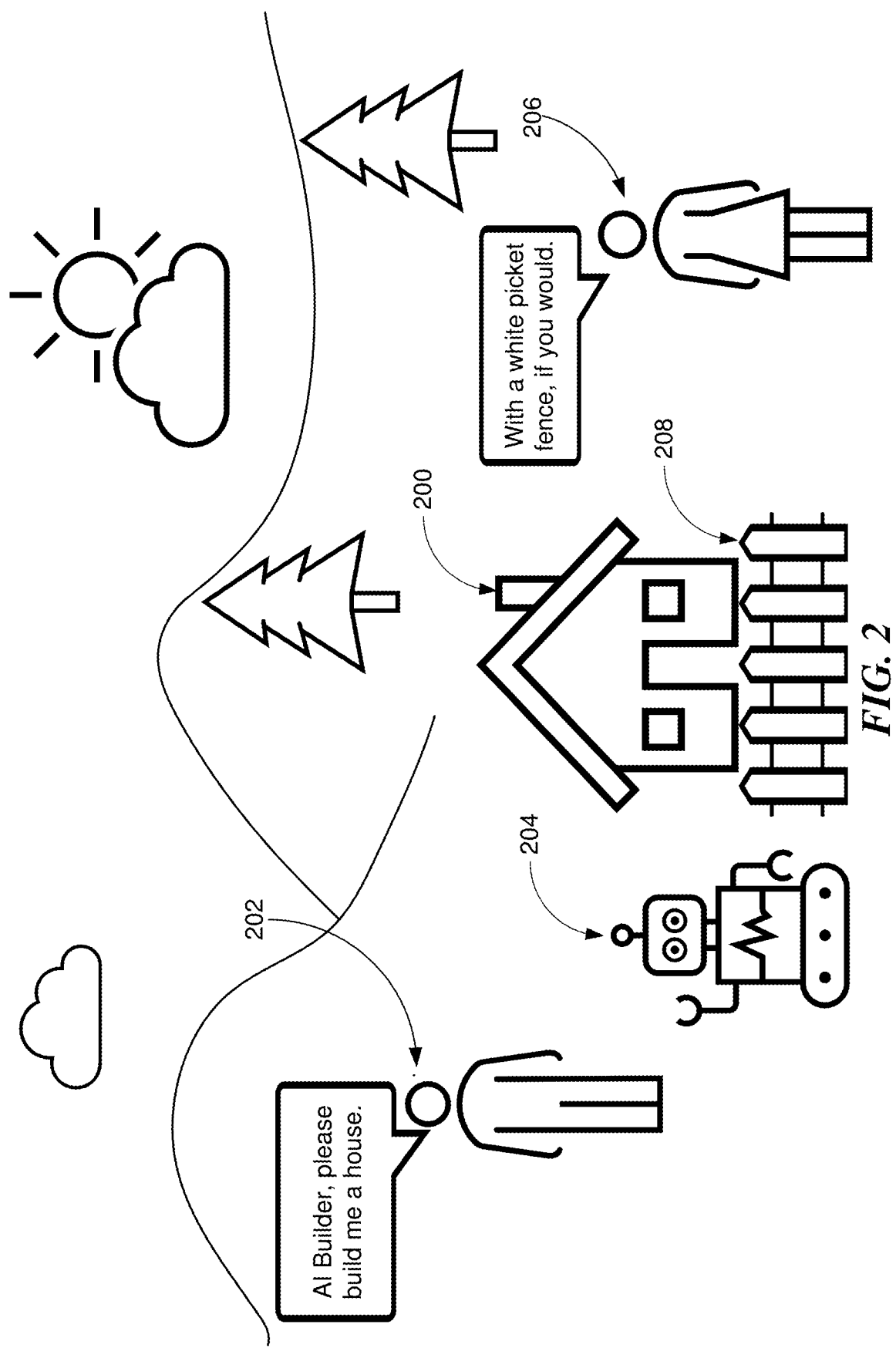
FIG. 2 is a conceptual diagram of users invoking an AI Builder to build a virtual house.

The user may now wish to begin to populate his space with particular objects, such as a house and within the house, chairs, windows, an actual picture of his family made into wall art, and the like. FIG. 2 shows the AI Builder making a house 200. In this figure, the user 202 commands invoke the AI Builder's NPC UI, shown here as a robot 204. This NPC UI makes collaboration in the XR world easier and more engaging. In FIG. 2, the user's friend 206 also interacts with the AI Builder's NPC, requesting that the house 200 have a white picket fence 208.

The AI Builder can create all sorts of objects. These objects can include ambient sounds (e.g., background noises associated with nature and people in a small village in the mountains), a musical soundtrack if the user so desires, sounds specific to objects created by the user in his space (e.g., a windchime on his porch), and sounds associated with NPCs.

The AI Builder can give certain objects appropriate actions, e.g., action profiles can be pre-defined for certain object types (where the object types are specified by the creating user or automatically by performing object classification on generated objects). For example, animals can wander around, though wild animals would avoid populated areas. Trees can sway in the wind. A ball can roll if the wind is strong enough or if it is kicked. In some cases, a closest matching movement profile can be assigned to generated objects or a user can manually add or change a movement profile for a given generated object. The AI Builder can assist the user in creating engaging NPCs. "Generic" wildlife can be created that act realistically, while pets can be customized to respond to their owners. NPCs can be made to respond when spoken to, can provide information, follow requests, etc. Realism is not required, and with the assistance of the AI Builder, user's can quickly implement their imaginings.

Figure 3:
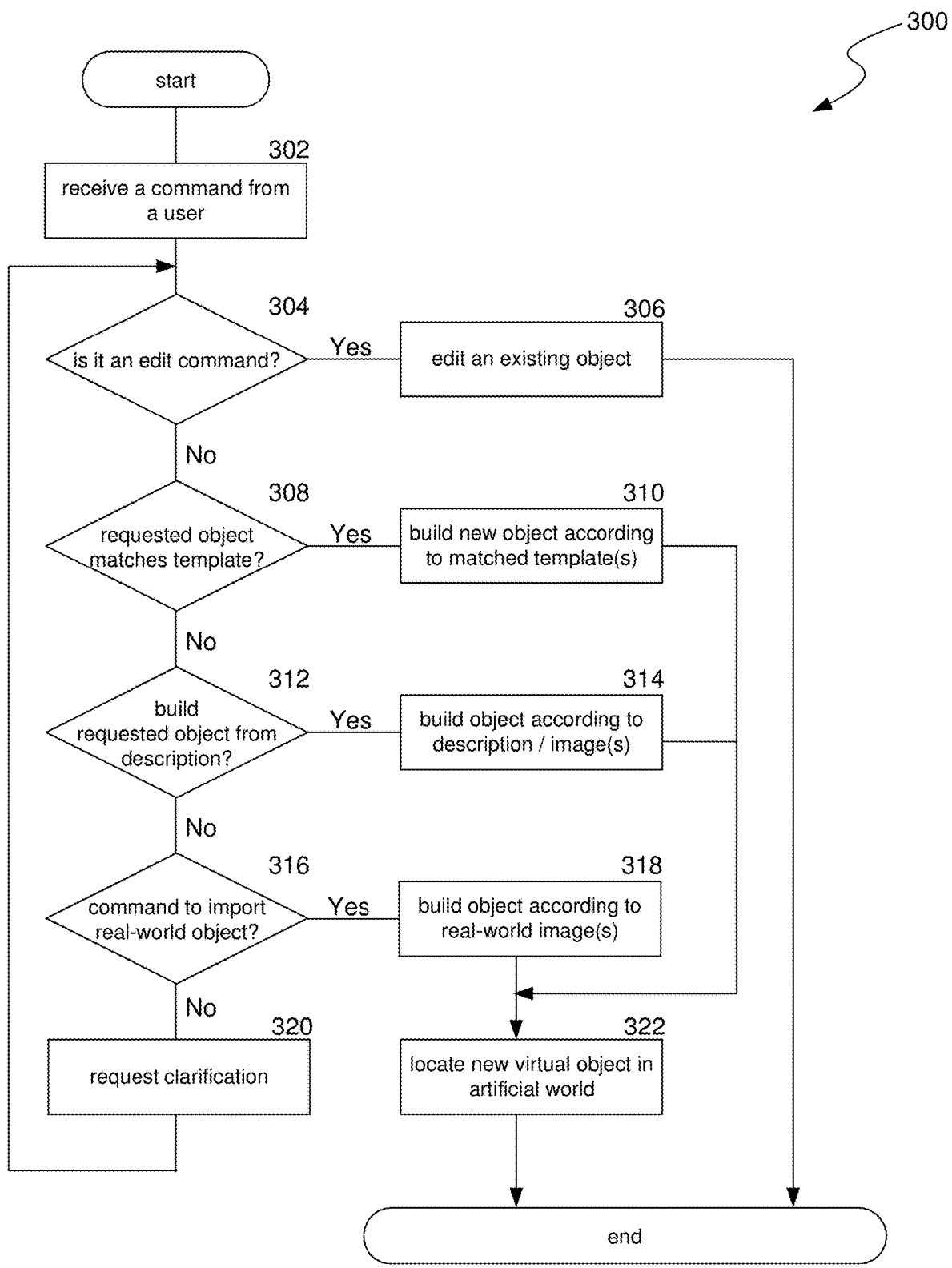
FIG. 3 is a flow diagram illustrating a process used in some implementations of the present technology for building virtual objects.

FIG. 3 is a flow diagram illustrating a process 300 used in some implementations of the AI Builder. Process 300 can be performed when an a XR experience is loaded, such as an existing artificial reality environment which can include the AI builder for the user to add-on to the existing artificial reality environment or an artificial reality environment builder application in which one or more users can provide building/editing commands. In various implementations, process 300 can be performed on a client device controlling such an artificial reality environment or a server that performs process 300 in conjunction with such a client device.

At block 302, process 300 can receive a command. As noted above, there are several possible command modalities. It may be a verbal command, a user gesture, input from an XR controller, or a combination of these. In some cases, a process running on a client device or server hosting the XR space gets a stream of user audio (the verbal command) from a client, which is then streamed to a speech recognition server. In some cases, process 300 can employ a builder NPC to carry out commands. In some cases, process 300 can use a wake phrase. In other cases, process can eliminate the need for a "wake phrase" to distinguish when the user is providing a build/edit command versus making some other comment or talking with another user. For example, process 300 can determine if the user is providing a command based on whether the user is looking or pointing at the builder NPC, pointing to a location appropriate for building a new object (e.g., if there is enough space at the indicated location for a default size of an indicated object to create and/or if there is sufficient match in a sematic space between an object to be built and objects surrounding an indicated location), and/or by mapping the content of the command into a semantic space (e.g., applying an NLP model) to determine whether the words of the command match a type for known commands. For example, the NPL model can map the user text into a semantic space and determine the distance from the text location to the center of an area of the semantic space identified for commands, and if the distance is below a threshold, the text can be identified as a command.

As part of the command, the user may present one or more images, 2D or 3D, to process 300, which may be used at block 310 to match with an existing template, or at block 314 to generate a new virtual object. In some cases, the images can be captured through a process where the user progresses through a flow to capture images of a real-world object (as discussed below in relation to blocks 316 and 318) from various angles sufficient to generate depth information and generate a corresponding 3D model.

At block 304, process 300 parses the command to see if the user wants to edit an existing object. If so, the process 300 moves to block 306. The command can be determined to be an edit command if the command indicates an existing object to edit ("the bird over there"), if the user's gaze was fixed on an object while speaking, or if the user made a particular gesture while speaking (e.g., by pointing). The selected object may be a sub-part of another object, (e.g., "the far wall of the blue house"). In any case, because the AI Builder knows the properties of the existing objects in the user's world, it knows which commands are applicable to an existing object. For example, tags for existing objects can be mapped into a semantic space and words of the command can be mapped into that semantic space, and a command can be determined to indicate an existing object if the distance between a) the command words and b) the tags for a closest existing object is below a threshold. If the given command is an edit command applicable to an existing object, process 300 performs the command at block 306 (which could involve bringing up a menu of further commands). For example, process 300 can apply a natural language processing model to determine an intent of the edit command in relation to the indicated object, by mapping aspects of the command, such as phrases, to editing options such as "resize," "move," "change color," "delete," etc., which in turn can be mapped to corresponding edit actions process 300 can implement. For example, each command can correspond to one or more processes that the NLP model can map portions of the comment and command context into. As a more specific example, once a move command is identified, process 300 can determine the process for a move command requires a subject virtual object and a destination, and can parse the command (and command context such as user gaze, gesture, or available surrounding locations or objects) to identify these elements to execute the move command.

Unlike an edit command which is tied to the properties of an existing object, there are several logic pathways available when a new object is being created. If in block 304, the command is interpreted as a "build a new object command," then process 300 reviews the command to see which logic pathway 308, 312, or 316 it should follow. In some implementations, instead of analyzing these pathways sequentially as shown in FIG. 3, process 300 reviews all pathways 308, 312, and 316 at the same time when it parses the user's command. The pathways 308, 312, and 316 are shown sequentially merely for ease of illustration.

In block 308, process 300 checks if the command (which may include indications of contextual information such as the surrounding objects or additional information such as user-provided images) specifying an object to be built matches at least one known template from the library. For example, in FIG. 2, the AI Builder interprets the first user's command to build a house 200, and there are several known house templates. In this case, process 300 picks a best matching template and builds a new object according to that template (block 310). Process 300 can accomplish this in some cases by taking words from the command, images from the command, indications of other context for the command such as objects surrounding the build location, etc., and matching them to tags defined for the items in the library. In some cases, process 300 can accomplish this matching by using a model trained on the library which takes the command and provides an indication of a top scoring model from the library, which can be used if the match score is above a threshold. In some implementations, this model can be a model trained (based on known matches) to match words of the command to templates by mapping the command words into a semantic space and tags for the model into the semantic space and finding a distance, in the semantic space, between them, where this distance can be a match score. In other implementations, the model (e.g., a neural network) can be trained based on known matches by taking representations of words form known commands and of matching or non-matching templates (e.g., tags for the templates), to produce a match score and updating model parameters based on a comparison of the generated match score to whether there was a known match between the command and the template. Once the model has been thus trained, the model can be used to generate match scores between commands and templates for which it's not already known whether they match. If the user has also or alternatively provided one or more images, process 300 can use them to search the library—either by applying a machine learning model trained to match images to 3D models, or by applying a machine learning model trained to generate semantic tags for images, which can then be used by the above process to search the library in a manner similar to when the user provides a verbal description.

If, from block 308, process 300 cannot find a sufficient match in the library to a known template, then it proceeds to block 312 and checks to see if the command verbally describes an object for the AI to build or includes one or more images of an object to build. In some cases, if no image is included, process 300, in block 312, attempts to match the verbal description of the object to be built to tagged metadata associated with images in an image data set to select an image from which to build a virtual object. If one or more verbal descriptions are provided, one or more images are provided, or one or more images were found matching the command, then process 300 proceeds to block 314 to build a virtual object according to the verbal description and/or images. At block 314 process 314 can apply the verbal description and/or one or more provided or found images to a generative adversarial network (GAN) model trained to produce a virtual object from such descriptions and/or images. Such a model can be trained to produce such virtual objects based on known pairings of descriptions and/or images to virtual objects.

If no matches are found and/or no verbal description is provided, process 300 continues to block 316. At block 316, process 300 can check whether the user's command indicates the user would like to import a real-world object into the XR space. This can include the user providing a verbal command for building a real world object, providing the command, such as "build this object," while indicating a real-world object (e.g., with her gaze, pointing, directing a camera at a real-world object, etc.), or selecting a UI element corresponding to building a real-world object. If so, process 300 can continue to block 318.

At block 318, process 300 can direct the user to take (or other wise provide previously taken) one or more photos of the real-world object, e.g., from various angles/viewpoints. Process 300 can then build a 3D model according to a user description from the command, from one or more images included with the command or selected based on the command description, and/or from the guided process of capturing one or more images of a real-world object. If, for example, the one or more images are 2D, then a GAN can retrieve depth information associated with the 2D image (if it was taken with a depth-enabled camera), or the GAN may infer depth information from the image by applying a machine learning model trained to generate depth data for an image or series of images. Once the depth data is generated or determined from included 3D images, process 300 can combine the depth data for the images into a 3D model by determining a common coordinate space and mapping the depth data to points for a 3D mesh. Process 300 can also apply color and texture to the built 3D object based on information in the image and/or verbal description. Thus, process 300 in block 318 allows the user to easily create 3D objects from verbal descriptions, provided images, and/or "import" real objects familiar to her into her XR world.

If process 300 cannot interpret the user's command in any of the above ways, process 300 asks for clarification in block 320. The clarification can be considered separately or with the original command as a new command which process 300 can interpret by returning to block 304.

If process 300 built a new object in blocks 310, 314, or 318, process 300 can also parse the command for object location information and/or looks at contextual information (e.g., the nature of the object, objects that already exist in the user's XR environment, where the user was looking or pointing, user location history in the XR space, etc.) and, if possible, places the object where the user indicated (at block 322).

In selecting a location for the new object, process 300 considers the object's nature. Because it understands the nature of the object it is building, process 300 avoids forcing the user to make numerous common-sensical editing commands by locating the new object in accordance with its nature. For example, a house's nature generally requires that it should be built on the ground and in a space with enough open area to accommodate the default size of the house 3D model (without overlapping other objects), and process 300 can limit creation locations to such available spaces. In various implementations, the location selection process can have various rules that it applies to objects to determine the most appropriate location. These can be rules that filter for possible locations (such as being in the creating user's view, having enough space to accommodate the default size of the virtual object being built, being of a type matching a required type for the virtual object—e.g., houses having a required land location type, boats having a required water location type, and planes having a required air location type, and/or areas that the user is allowed to build in) and rules that rank remaining unfiltered locations (such as an estimation for where the user was looking or gesturing when they made the command, a relevance between the virtual object to be built and other real or virtual objects near that location based on model semantic matching as discussed above, a match between a user's verbally specified location—such as "by that tree" or "next to the green house," relevance to the user's history of being in or building at particular locations, etc.) Once the locations have bene filtered according to the filter rules and then ranked according to the ranking rules, the highest ranked remaining location can be selected to build the virtual object.

Process 300 can also consider other objects that already exist in the user's XR world to select a location for the new object. Generally speaking, this means that the new object is placed to avoid overlap (e.g., do not place a car where a tree is growing), but process 300 could also can locate the new object near related objects (as determined by tags for the objects being mapped into a semantic space and finding the distance between the tags). For example, a new car could be placed on an existing driveway or road, because the tags for a car are mapped in the semantic space close to the tags for a road.

Process 300 can also consider specific information supplied by the user, such as "by the tall tree" or where the user is pointing or looking when the build command was given. For example, when placing the new object in the direction in which the user is pointing, process 300 limits the distance in that direction to what the user can currently see, with preference given to locations nearer the user. In a similar manner, the world may already contain a number of tall trees, but "by the tall tree" can be taken to refer to a tall tree near to the user or in the direction of his gaze. Process 300 can use an NLP engine to identify parts of the verbal command that refer to location (e.g., through keyword analysis such as "by," "near," "next to," etc. and/or by using a parts of speech tagger trained to segment the verbal command into a object identifying part and a location identifying part). The NLP engine can further then identify location identifying parts of the verbal command that reference an existing object/space in the XR space and then identify a specified relationship to that existing object or space (e.g., "on top of," "next to," "across from," etc.)

Process 300 can also consider specific the user's history in the XR space when selecting a location. For example, a location may be less likely to be selected if the user has never been to or seen that location. As another example, a location may be more likely if the user has spent significant time near the location, has built other objects near the location, etc. As yet another example, a location may be more likely if the user has friends or is part of a group that has built or is otherwise associated with a location.

In various implementations, the above criteria can be used to filter locations in the XR space from consideration (e.g., those where the object cannot be placed or those the user has never seen) and to score the unfiltered locations (e.g., with defined weights for aspects such as where the user is looking, where the user is pointing, a likelihood the user's verbal command indicates a location, etc.) The highest scoring location can be selected to build the new object.

If the user's command does not provide enough location specifics for process 300 to decide on a sensible location (e.g., all locations are filtered out or no location has a score above a threshold) or the system cannot build a corresponding object, process 300 queries the user for further directions (e.g., asking the user to select a particular location). In any case, the user can override process 300's location or build choices by entering an edit command (block 302).

The above description of process 300 shows how the AI Builder interprets build and edit commands. To receive and implement those commands, the AI Builder may implement a UI by creating a builder NPC (e.g., the robot 204 in FIG. 2) in the user's artificial world. For example, the NPC can go to the location indicated and perform building actions (e.g., constructing the object, waiving a wand, opening a object import portal, etc.) The NPC 204 eases collaboration among users who wish to build something together and provides a user experience which is more engaging than just a disembodied voice UI or objects that appear from nowhere. While a "wake phrase may be used in some implementations, in other cases, the use of an NPC 204 can also eliminate the need for a "wake phrase" to distinguish when the user is providing a build/edit command versus making some other comment or talking with another user. For example, the AI Builder can determine if the user is providing a command based on whether the user is looking or pointing at the builder NPC 204, pointing to a location appropriate for building a new object, and/or by mapping the content of the command into a semantic space (e.g., applying an NLP model) to determine whether the words of the command match a type for known commands. The AI Builder's NPC 204 is a collaboration point for multiple users to build together and to illustrate the building process.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Previous systems do not support non-tech-savvy users in creating and populating richly imagined artificial worlds. Instead, each user had to depend upon his own scripting capabilities or purchase built objects from experts. Most users were thus disengaged from the world-creation process. The AI Builder system and methods disclosed herein are expected to overcome these deficiencies in existing systems. Through its verbal and gestural UI, the AI Builder helps even unsophisticated users to express their creativity in building sophisticated spaces and objects. The AI Builder interprets the user's desires and can build all sort of objects, either from its library of templates, or by matching a user-supplied image to an image data set, or by rendering a 3D virtual object from a user's real-world object. There is simply no analog among the previous scripting-language systems to the AI Builder's intelligence-backed UI. By supporting every user's innovative experiments, the AI Builder eases the entry of all users into the XR worlds, thus greatly increasing the participation of people in the benefits provided by XR, and, in consequence, greatly enhancing the value of the XR worlds and the systems that support them.

Figure 4:
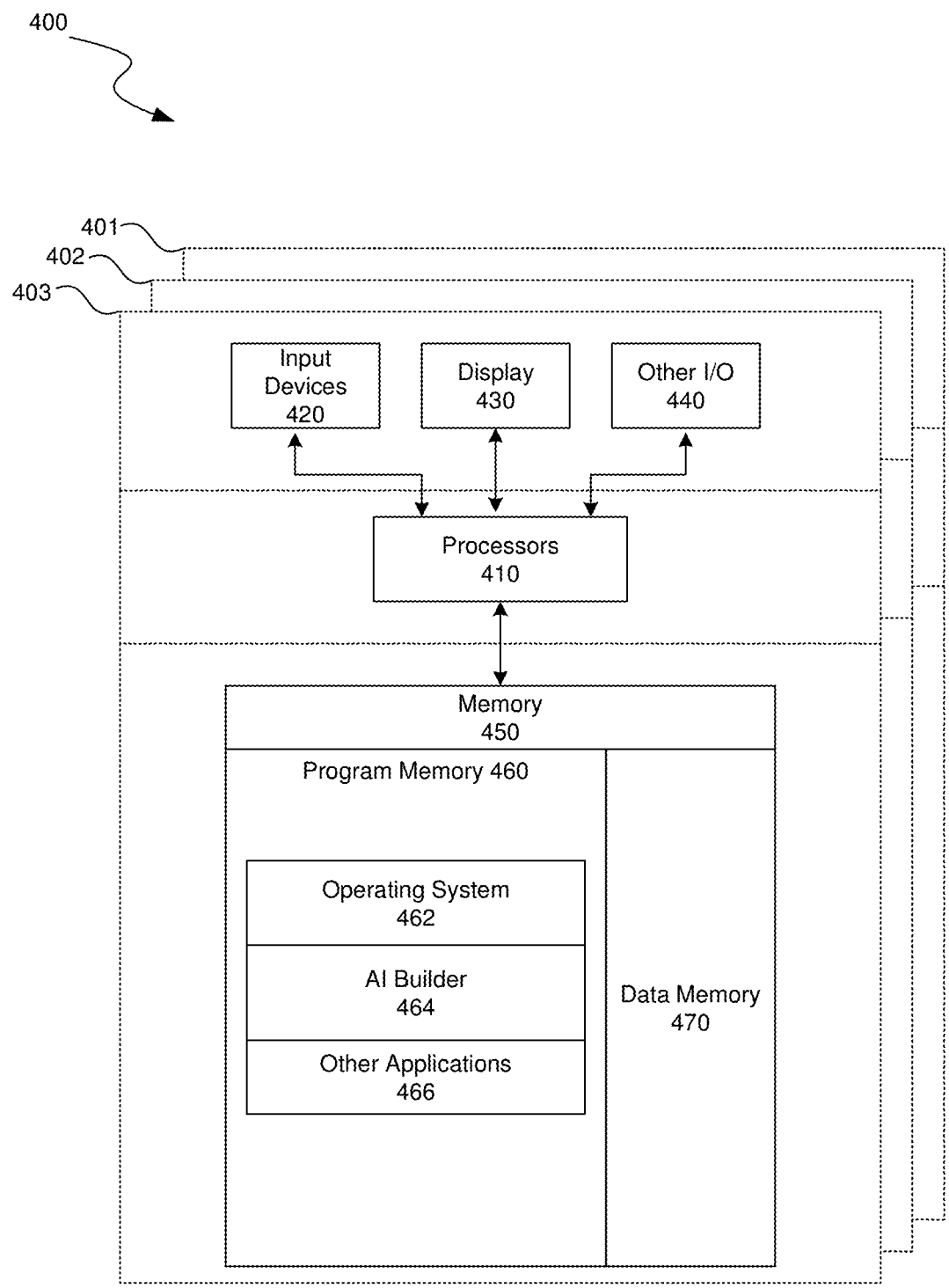
FIG. 4 is a block diagram illustrating an overview of devices on which some implementations of the present technology can operate.

Several implementations are discussed below in more detail in reference to the figures. FIG. 4 is a block diagram illustrating an overview of devices on which some implementations of the disclosed technology can operate. The devices can comprise hardware components of a computing system 400 that runs the AI Builder. In various implementations, computing system 400 can include a single computing device 403 or multiple computing devices (e.g., computing device 401, computing device 402, and computing device 403) that communicate over wired or wireless channels to distribute processing and share input data. In some implementations, computing system 400 can include a stand-alone headset capable of providing a computer created or augmented experience for a user without the need for external processing or sensors. In other implementations, computing system 400 can include multiple computing devices such as a headset and a core processing component (such as a console, mobile device, or server system) where some processing operations are performed on the headset and others are offloaded to the core processing component. Example headsets are described below in relation to FIGS. 5A and 5B. In some implementations, position and environment data can be gathered only by sensors incorporated in the headset device, while in other implementations one or more of the non-headset computing devices can include sensor components that can track environment or position data.

Computing system 400 can include one or more processor(s) 410 (e.g., central processing units (CPUs), graphical processing units (GPUs), holographic processing units (HPUs), etc.) Processors 410 can be a single processing unit or multiple processing units in a device or distributed across multiple devices (e.g., distributed across two or more of computing devices 401-403).

Computing system 400 can include one or more input devices 420 that provide input to the processors 410, notifying them of actions. The actions can be mediated by a hardware controller that interprets the signals received from the input device and communicates the information to the processors 410 using a communication protocol. Each input device 420 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 410 can be coupled to other hardware devices, for example, with the use of an internal or external bus, such as a PCI bus, SCSI bus, or wireless connection. The processors 410 can communicate with a hardware controller for devices, such as for a display 430. Display 430 can be used to display text and graphics. In some implementations, display 430 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 440 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 440, such as cameras, depth sensors, IMU sensor, GPS units, LiDAR or other time-of-flights sensors, etc. can be used by the computing system 400 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 400 or another computing system that had mapped the area. The SLAM system can track the user within the area based on factors such as GPS data, matching identified objects and structures to mapped objects and structures, monitoring acceleration and other position changes, etc.

Computing system 400 can include a communication device capable of communicating wirelessly or wire-based with other local computing devices or a network node. The communication device can communicate with another device or a server through a network using, for example, TCP/IP protocols. Computing system 400 can utilize the communication device to distribute operations across multiple network devices.

The processors 410 can have access to a memory 450, which can be contained on one of the computing devices of computing system 400 or can be distributed across of the multiple computing devices of computing system 400 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 450 can include program memory 460 that stores programs and software, such as an operating system 462, AI Builder 464, and other application programs 466. Memory 450 can also include data memory 470 that can include, e.g., object templates and reference images for the AI Builder 464, configuration data, settings, user options or preferences, etc., which can be provided to the program memory 460 or any element of the computing system 400.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 5A:
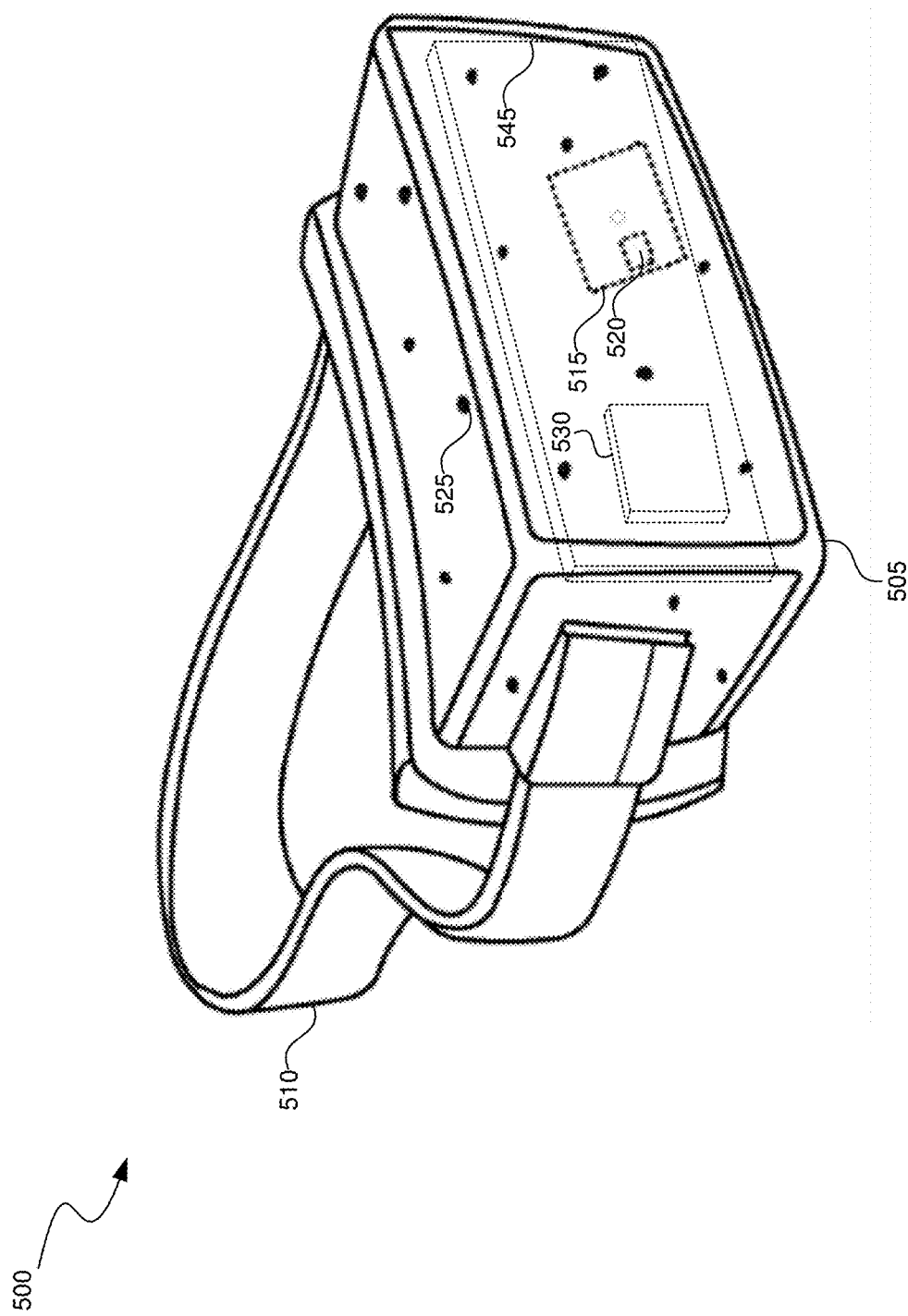
FIG. 5A is a wire diagram illustrating a virtual reality headset which can be used in some implementations of the present technology.

FIG. 5A is a wire diagram of a virtual reality head-mounted display (HMD) 500, in accordance with some embodiments. The HMD 500 includes a front rigid body 505 and a band 510. The front rigid body 505 includes one or more electronic display elements of an electronic display 545, an inertial motion unit (IMU) 515, one or more position sensors 520, locators 525, and one or more compute units 530. The position sensors 520, the IMU 515, and compute units 530 may be internal to the HMD 500 and may not be visible to the user. In various implementations, the IMU 515, position sensors 520, and locators 525 can track movement and location of the HMD 500 in the real world and in an artificial reality environment in three degrees of freedom (3DoF) or six degrees of freedom (6DoF). For example, the locators 525 can emit infrared light beams which create light points on real objects around the HMD 500. As another example, the IMU 515 can include e.g., one or more accelerometers, gyroscopes, magnetometers, other non-camera-based position, force, or orientation sensors, or combinations thereof. One or more cameras (not shown) integrated with the HMD 500 can detect the light points. Compute units 530 in the HMD 500 can use the detected light points to extrapolate position and movement of the HMD 500 as well as to identify the shape and position of the real objects surrounding the HMD 500.

The electronic display 545 can be integrated with the front rigid body 505 and can provide image light to a user as dictated by the compute units 530. In various embodiments, the electronic display 545 can be a single electronic display or multiple electronic displays (e.g., a display for each user eye). Examples of the electronic display 545 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 500 can be coupled to a core processing component such as a personal computer (PC) (not shown) and/or one or more external sensors (not shown). The external sensors can monitor the HMD 500 (e.g., via light emitted from the HMD 500) which the PC can use, in combination with output from the IMU 515 and position sensors 520, to determine the location and movement of the HMD 500.

Figure 5B:
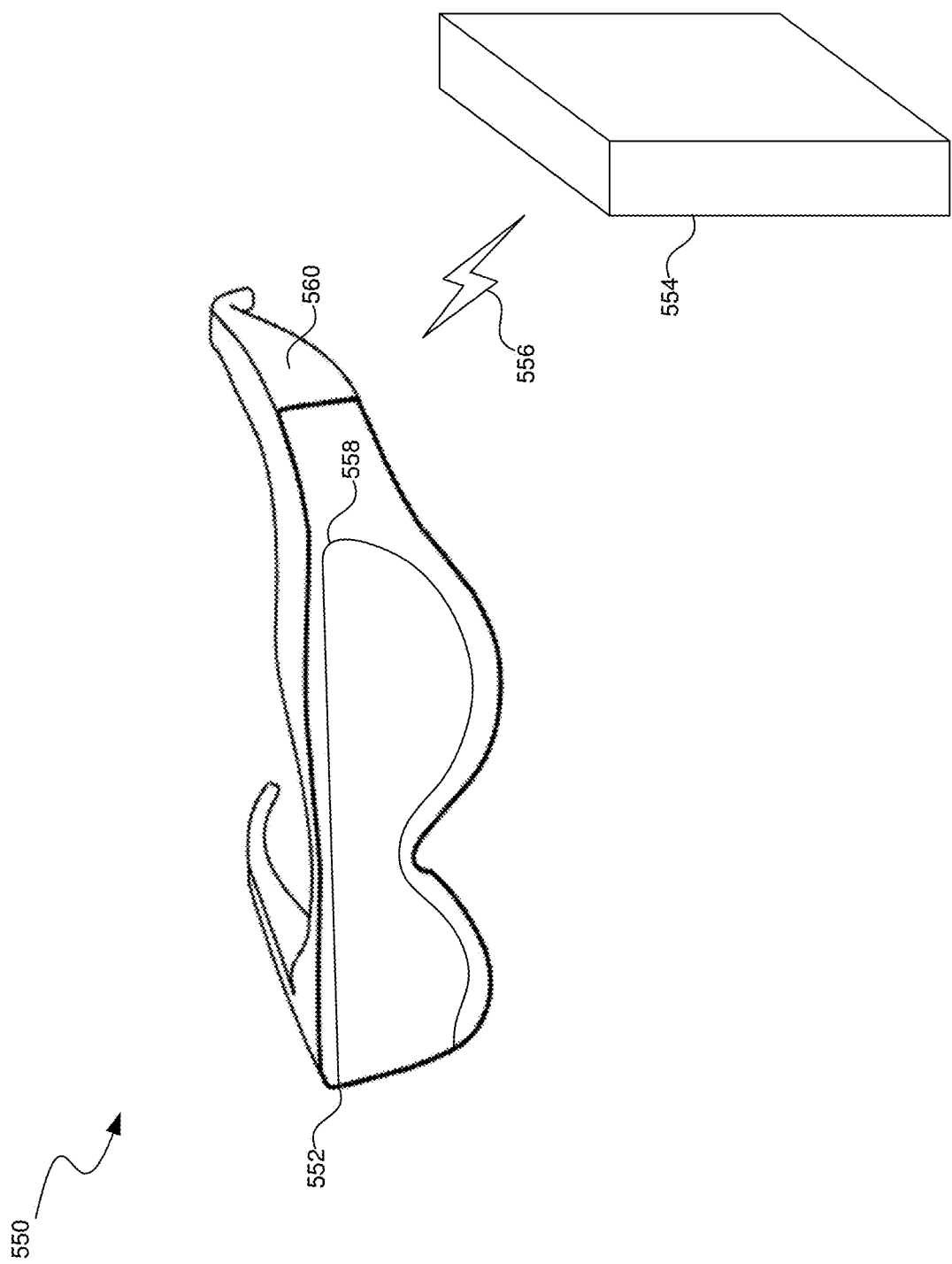
FIG. 5B is a wire diagram illustrating a mixed reality headset which can be used in some implementations of the present technology.

FIG. 5B is a wire diagram of a mixed reality HMD system 550 which includes a mixed reality HMD 552 and a core processing component 554. The mixed reality HMD 552 and the core processing component 554 can communicate via a wireless connection (e.g., a 60 GHz link) as indicated by link 556. In other implementations, the mixed reality system 550 includes a headset only, without an external compute device or includes other wired or wireless connections between the mixed reality HMD 552 and the core processing component 554. The mixed reality HMD 552 includes a pass-through display 558 and a frame 560. The frame 560 can house various electronic components (not shown) such as light projectors (e.g., LASERs, LEDs, etc.), cameras, eye-tracking sensors, MEMS components, networking components, etc.

The projectors can be coupled to the pass-through display 558, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 554 via link 556 to HMD 552. Controllers in the HMD 552 can convert the image data into light pulses from the projectors, which can be transmitted via the optical elements as output light to the user's eye. The output light can mix with light that passes through the display 558, allowing the output light to present virtual objects that appear as if they exist in the real world.

Similarly to the HMD 500, the HMD system 550 can also include motion and position tracking units, cameras, light sources, etc., which allow the HMD system 550 to, e.g., track itself in 3DoF or 6DoF, track portions of the user (e.g., hands, feet, head, or other body parts), map virtual objects to appear as stationary as the HMD 552 moves, and have virtual objects react to gestures and other real-world objects.

Figure 5C:
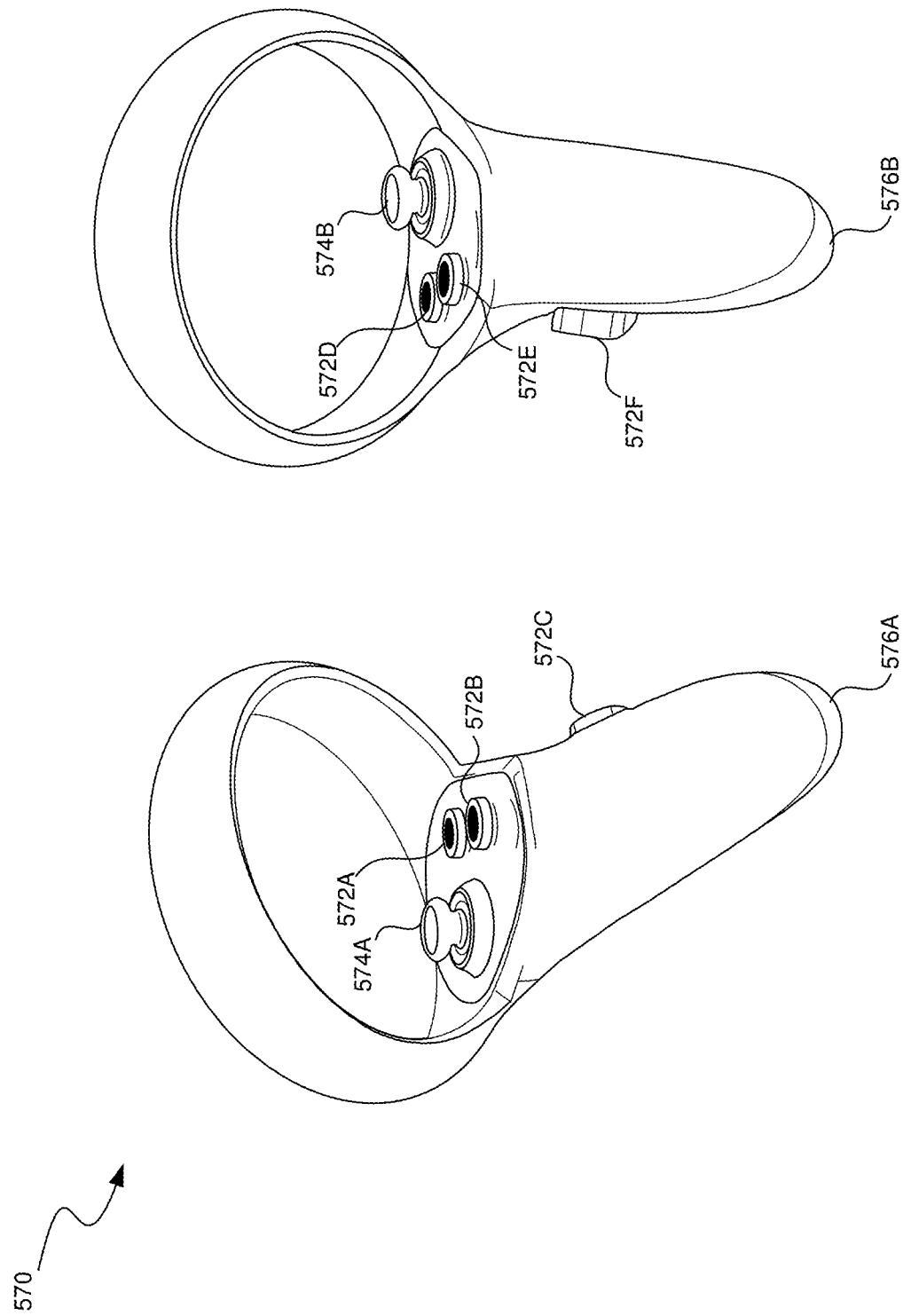
FIG. 5C is a wire diagram illustrating controllers which, in some implementations, a user can hold in one or both hands to interact with an artificial reality environment.

FIG. 5C illustrates controllers 570 (including controller 576A and 576B), which, in some implementations, a user can hold in one or both hands to interact with an artificial reality environment presented by the HMD 500 and/or HMD 550. The controllers 570 can be in communication with the HMDs, either directly or via an external device (e.g., core processing component 554). The controllers can have their own IMU units, position sensors, and/or can emit further light points. The HMD 500 or 550, external sensors, or sensors in the controllers can track these controller light points to determine the controller positions and/or orientations (e.g., to track the controllers in 3DoF or 6DoF). The compute units 530 in the HMD 500 or the core processing component 554 can use this tracking, in combination with IMU and position output, to monitor hand positions and motions of the user. The controllers can also include various buttons (e.g., buttons 572A-F) and/or joysticks (e.g., joysticks 574A-B), which a user can actuate to provide input and interact with objects.

In various implementations, the HMD 500 or 550 can also include additional subsystems, such as an eye tracking unit, an audio system, various network components, etc., to monitor indications of user interactions and intentions. For example, in some implementations, instead of or in addition to controllers, one or more cameras included in the HMD 500 or 550, or from external cameras, can monitor the positions and poses of the user's hands to determine gestures and other hand and body motions. As another example, one or more light sources can illuminate either or both of the user's eyes and the HMD 500 or 550 can use eye-facing cameras to capture a reflection of this light to determine eye position (e.g., based on set of reflections around the user's cornea), modeling the user's eye and determining a gaze direction.

Figure 6:
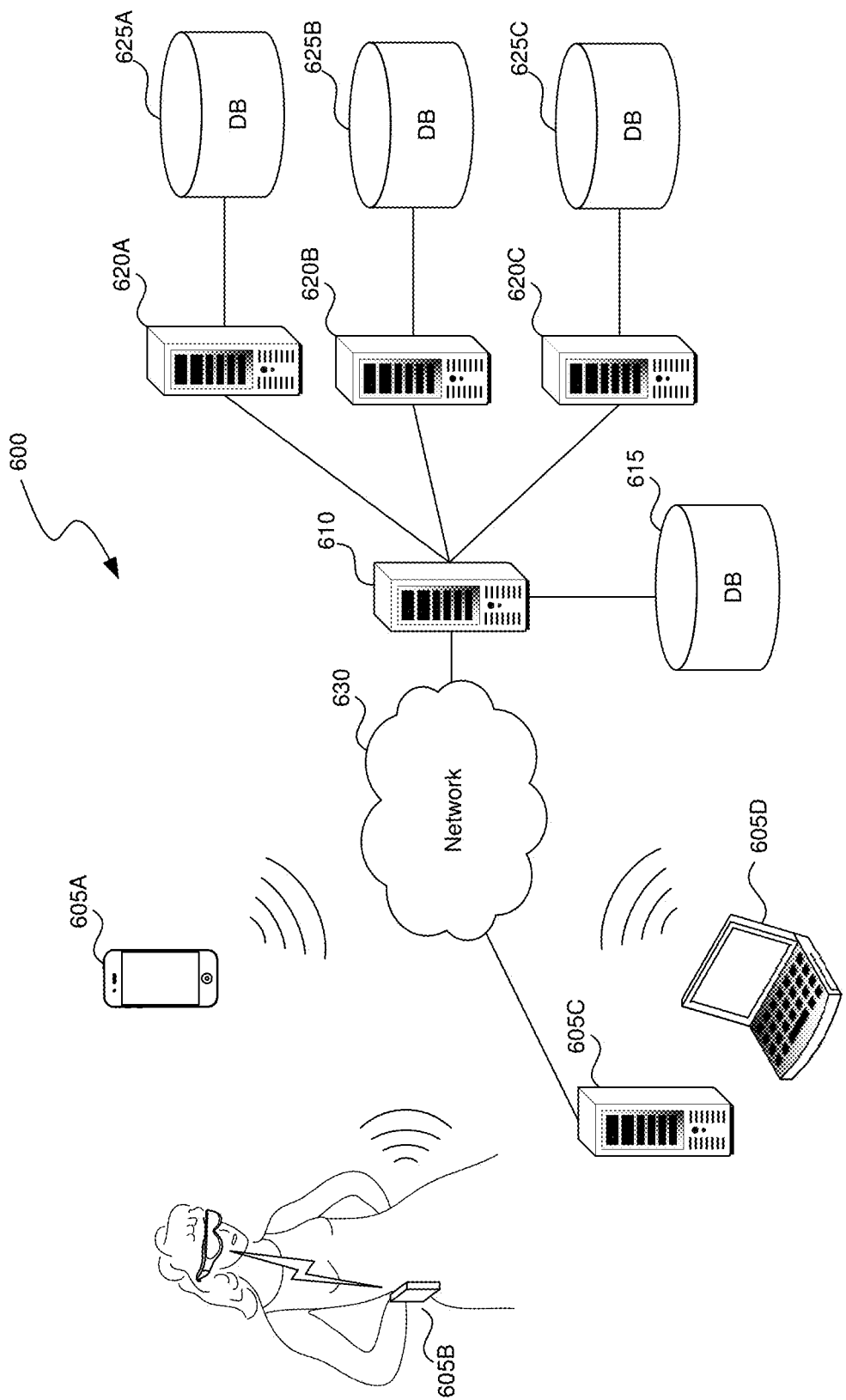
FIG. 6 is a block diagram illustrating an overview of an environment in which some implementations of the present technology can operate.

FIG. 6 is a block diagram illustrating an overview of an environment 600 in which some implementations of the disclosed technology can operate. Environment 600 can include one or more client computing devices 605A-D, examples of which can include computing system 400. In some implementations, some of the client computing devices (e.g., client computing device 605B) can be the HMD 500 or the HMD system 550. Client computing devices 605 can operate in a networked environment using logical connections through network 630 to one or more remote computers, such as a server computing device.

In some implementations, server 610 can be an edge server which receives client requests and coordinates fulfillment of those requests through other servers, such as servers 620A-C. Server computing devices 610 and 620 can comprise computing systems, such as computing system 400. Though each server computing device 610 and 620 is displayed logically as a single server, server computing devices can each be a distributed computing environment encompassing multiple computing devices located at the same or at geographically disparate physical locations.

Client computing devices 605 and server computing devices 610 and 620 can each act as a server or client to other server/client device(s). Server 610 can connect to a database 615. Servers 620A-C can each connect to a corresponding database 625A-C. As discussed above, each server 610 or 620 can correspond to a group of servers, and each of these servers can share a database or can have their own database. Though databases 615 and 625 are displayed logically as single units, databases 615 and 625 can each be a distributed computing environment encompassing multiple computing devices, can be located within their corresponding server, or can be located at the same or at geographically disparate physical locations.

Network 630 can be a local area network (LAN), a wide area network (WAN), a mesh network, a hybrid network, or other wired or wireless networks. Network 630 may be the Internet or some other public or private network. Client computing devices 605 can be connected to network 630 through a network interface, such as by wired or wireless communication. While the connections between server 610 and servers 620 are shown as separate connections, these connections can be any kind of local, wide area, wired, or wireless network, including network 630 or a separate public or private network.

Those skilled in the art will appreciate that the components illustrated in FIGS. 4-6 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for building a virtual object in an XR world, the method comprising:
   receiving, by an artificial intelligence ("AI"), a command from a user, wherein the command is associated with one or more images and the artificial intelligence is represented by a non-player character (NPC) in the XR world;
   determining that the command is an object build command, wherein the determining is based on A) a determination that the user's attention is directed at the NPC, B) that the command includes the one or more images, and C) that the command does not indicate an existing virtual object in the XR world;
   parsing a textual representation, of part of the command, for object type information and object location information;
   building a 3D virtual object based on the one or more images and the object type information;
   identifying a location, in the XR world, based on the object location information from the command and a direction determined for the user's attention; and
   placing the built 3D virtual object in the XR world according to the identified location.

2. The method of claim 1, wherein the one or more images are provided through a process that guides the user in capturing multiple images of a real-world object to import into the XR world.

3. The method of claim 1, wherein the AI represented by the NPC is controlled by multiple users, such that commands from a later user are implemented, in relation to objects built by the AI, based on commands from an earlier user.

4. The method of claim 1, wherein the determination that the user's attention is directed at the NPC is based on a determined gaze direction of the user.

5. The method of claim 1, wherein the determination that the user's attention is directed at the NPC is based on a determined gesture direction of the user.

6. The method of claim 1, wherein the determination that the command does not indicate an existing virtual object in the XR world is based on a determination that a verbal portion of the command does not correspond to a virtual object in view of the user.

7. The method of claim 1, wherein the determination that the command does not indicate an existing virtual object in the XR world is based on a determined gaze of the user.

8. The method of claim 1, wherein the parsing the textual representation of the part of the command for object type information comprises applying a machine learning model trained, based on pre-established pairings of object types to language, to identify object types.

9. The method of claim 1, wherein the parsing the textual representation of the part of the command for object location information comprises applying a machine learning model trained, based on pre-established pairings of location data to language, to identify object locations.

10. The method of claim 1, wherein the building a 3D virtual object includes applying the one or more images to a GAN machine learning model that produces 3D virtual objects.

11. The method of claim 1, wherein the identifying the location in the XR world comprises applying a set of filtering rules that exclude some locations, by excluding A) locations outside the user's view, B) locations that are too small to accommodate a default size of the virtual object being built, and C) locations that have an assigned type that do not match a required type for the virtual object being built.

12. The method of claim 1, wherein the identifying the location in the XR world comprises:
   applying a set of ranking rules, to particular locations, to generate a rank sore for locations based on X) an estimation for where the user was looking or gesturing when the user made the command, Y) a relevance between the virtual object being built and other objects near the particular location, and Z) a match between the object location information and the particular location; and
   selecting the highest ranked location.

13. A computer-readable storage medium storing instructions that, when executed by a computing system, cause the computing system to perform a process for building a virtual object in an XR world, the process comprising:
- receiving, by an artificial intelligence ("AI"), a command from a user, wherein the artificial intelligence is represented by a non-player character (NPC) in the XR world;
- determining that the command is an object build command, wherein the determining is based on A) a determination that the user's attention is directed at the NPC and B) that the command does not indicate an existing virtual object in the XR world;
- parsing a textual representation, of part of the command, for object type information and object location information;
- building a 3D virtual object using a template, from a 3D model library, matching the object type information;
- identifying a location, in the XR world, based on the object location information from the command and a direction determined for the user's attention; and
- placing the built 3D virtual object in the XR world according to the identified location.

14. The computer-readable storage medium of claim 13, wherein the AI represented by the NPC is controlled by multiple users, such that commands from a later user are implemented, in relation to objects built by the AI, based on commands from an earlier user.

15. The computer-readable storage medium of claim 13, wherein the determination that the user's attention is directed at the NPC is based on a determined gaze direction of the user.

16. The computer-readable storage medium of claim 13, wherein the determination that the command does not indicate an existing virtual object in the XR world is based on a determination that a verbal portion of the command does not correspond to a virtual object in view of the user.

17. The computer-readable storage medium of claim 13, wherein the determination that the command does not indicate an existing virtual object in the XR world is based on a determined gaze of the user.

18. The computer-readable storage medium of claim 13, wherein the building a 3D virtual object includes matching the object type information to the template by matching A) words from the command and indications of objects surrounding the location in the XR world to B) tags defined for the items in the library, wherein the matching is performed using a model trained, based on known matches, that maps the words from the command and the indications of objects surrounding the location in the XR world into a semantic space and finding a distance, in the semantic space, between the mapped locations and locations in the semantic space for the tags for templates in the library.

19. The computer-readable storage medium of claim 13, wherein the identifying the location in the XR world comprises applying a set of filtering rules that exclude some locations, by excluding A) locations outside the user's view, B) locations that are too small to accommodate a default size of the virtual object being built, and C) locations that have an assigned type that do not match a required type for the virtual object being built; and
wherein the identifying the location in the XR world comprises:
- applying a set of ranking rules, to particular locations, to generate a rank sore for locations based on X) an estimation for where the user was looking or gesturing when the user made the command, Y) a relevance between the virtual object being built and other objects near the particular location, and Z) a match between the object location information and the particular location; and
- selecting the highest ranked location.

20. A computing system for building a virtual object in an XR world, the computing system comprising:
- one or more processors; and
- one or more memories storing instructions that, when executed by the one or more processors, cause the computing system to perform a process comprising:
  - receiving, by an artificial intelligence ("AI"), a command from a user, wherein the artificial intelligence is represented by a non-player character (NPC) in the XR world;
  - determining that the command is an object build command, wherein the determining is based on A) a determination that the user's attention is directed at the NPC and B) that the command does not indicate an existing virtual object in the XR world;
  - parsing a textual representation, of part of the command, for object type information and object location information;
  - building a 3D virtual object using a template, from a 3D model library, matching the object type information;
  - identifying a location, in the XR world, based on the object location information from the command and a direction determined for the user's attention; and
  - placing the built 3D virtual object in the XR world according to the identified location.

* * * * *